(12) United States Patent
Braun et al.

(10) Patent No.: US 8,572,498 B2
(45) Date of Patent: Oct. 29, 2013

(54) SYSTEM AND METHOD FOR INFLUENCING AN ON-GOING EVENT

(76) Inventors: David J. Braun, Newtown, PA (US); Thomas A. Belton, Princeton, NJ (US)

( * ) Notice: Subject to any disclaimer, the term of this patent is extended or adjusted under 35 U.S.C. 154(b) by 1219 days.

(21) Appl. No.: 11/908,183

(22) PCT Filed: Mar. 10, 2006

(86) PCT No.: PCT/US2006/008684
§ 371 (c)(1),
(2), (4) Date: Sep. 10, 2007

(87) PCT Pub. No.: WO2006/099188
PCT Pub. Date: Sep. 21, 2006

(65) Prior Publication Data
US 2008/0311996 A1    Dec. 18, 2008

Related U.S. Application Data

(60) Provisional application No. 60/660,212, filed on Mar. 10, 2005, provisional application No. 60/737,593, filed on Nov. 17, 2005.

(51) Int. Cl.
*G09G 5/00* (2006.01)
(52) U.S. Cl.
USPC ............................................. 715/757; 463/42
(58) Field of Classification Search
USPC ......... 345/700; 463/1, 42; 707/600; 715/700, 715/757; 725/112
See application file for complete search history.

(56) References Cited

U.S. PATENT DOCUMENTS

| | | | |
|---|---|---|---|
| 3,983,483 A | 9/1976 | Pando | |
| 5,367,330 A | 11/1994 | Haave et al. | |
| 6,009,563 A | 1/2000 | Swanson | |
| 6,240,415 B1 * | 5/2001 | Blumberg | 1/1 |
| 6,772,433 B1 | 8/2004 | LaJoie et al. | |
| 2002/0133562 A1 * | 9/2002 | Newnam et al. | 709/216 |
| 2003/0025722 A1 * | 2/2003 | Cliff et al. | 345/700 |
| 2004/0031058 A1 * | 2/2004 | Reisman | 725/112 |

\* cited by examiner

*Primary Examiner* — Dmitry Suhol
*Assistant Examiner* — Jason Yen
(74) *Attorney, Agent, or Firm* — Roy Rosser

(57) ABSTRACT

A system and method for enabling spectators to participate in a sporting event in a way that may materially affect the course, and outcome, of the event. The players, or teams, participating in the sporting event agree to have certain decisions made by spectators who are supporters of the player or team. The decisions may range from the choice of the starting line up to actually calling plays during the game. The game influencing decisions are made by pre-registered spectators who vote by making a selection from a menu of possible choices related to a player's participation in the live sporting event. The spectators may be remote to the game and watching it on a television and voting using their remote control to make menu selections. Or the spectators may be in the stands watching the game, getting and responding to menus via their cell phones.

7 Claims, 3 Drawing Sheets

SYSTEM AND METHOD FOR INFLUENCING AN ON-GOING EVENT

CROSS REFERENCE TO APPLICATIONS

This application is related to, and claims priority from PCT/US06/008684 filed on Mar. 10, 2006 filed by David J. Braun and Thomas A. Belton titled SYSTEM AND METHOD FOR INFLUENCING AN ON-GOING EVENT, U.S. Provisional Patent application no. 60/660,212 on Mar. 10, 2005 filed by David J. Braun and Thomas A. Belton et al. titled "System and Method for a Golf Tournament", and to U.S. Provisional Patent application no. 60/737,593 on Nov. 17, 2005 filed by David J. Braun and Thomas A. Belton et al. titled "System and Method for Enabling Remote Participation in a Broadcast Sporting Event", the entire contents of both of which are hereby incorporated by reference.

TECHNICAL FIELD

The present invention relates to systems and methods for tournaments, and more particularly to systems and methods for enabling members of the public to participate in broadcast sporting events.

BACKGROUND ART

Many sporting events have become extremely popular as spectator events on broadcast television, while certain events are also, or instead, being broadcast over alternative interactive media such as the internet in the form of updated statistics, as well as over older media such as radio.

In both the traditional televised broadcasts and the broadcasts over the newer interactive media, the viewers are essentially passive watchers of a game, with no capability to influence the course, or outcome, of the event.

Many younger people have become accustomed to playing realistic video games in which they are actively engaged in both the course and the outcome of an event, and do not find passive viewing of sports events as particularly entertaining.

In order to compete for the attention of these younger viewers, who expect active involvement throughout the course of the entertainment, there is a need for new ways of broadcasting sporting events so that they are made appealing by providing viewer participation in the outcome of the event.

DISCLOSURE OF INVENTION

The present invention relates to a system and method for a spectator to participate in a broadcast sporting event in a way that may materially affect the course, and outcome, of the event.

In a preferred embodiment, one or more of the players, or teams, participating in a broadcast sporting event agree to have certain strategic, or tactical, decisions made or influenced, entirely or in part, by one or more pre-qualified fans or non-playing, non-staff members associated with that team.

The strategic or tactical decisions may rely on the existing rules of the game, or additional rules may be added to facilitate viewer participation. The types of decisions may, for instance, range from decisions such as the choice of the starting line up, the choice of when to substitute a player, and who to substitute, to actually calling, or participating in the calling, of plays during the game.

In a preferred embodiment, the game influencing decisions are made by pre-registered spectators who are supporters of one of the teams contesting the live sporting event that is being broadcast. These spectators vote by making a selection from a menu of options or possible choices that may, for instance, be related to a player's participation in the live sporting event. The spectators may be remote to the game watching it on, for instance, a television and voting using their remote control to make menu selections. Or the spectators may be in the stands watching the game, getting their menus via, for instance, their cell phones.

Based on the majority decision, i.e., the majority choice of a course of action received from the team supporting spectators, one of the possible choices is elected as a course of action to be taken by a player or a team. The elected course of action may then be relayed to the player, or players, for implementation as part of the live sporting event and only made public after the play has occurred. In further embodiments, the decision may be make by the "nth caller", i.e. by the single vote that is a designated number in a queue of voters, such as, but not limited to, the 100th caller or voter. In a further embodiment, the decision maker may be a single pre-selected fan chosen by, for instance, a lottery or by previously being the nth number voter. In a further embodiment of the invention, a voter's influence may be weighted by the voters prior voting record, including, but not limited to, the accuracy of their prior record. In a further embodiment, through out the game, various decisions may be influenced by a mixture of such voting and selection methods.

The technology to implement the method may, for instance, include pre-registration of fans using conventional cable television technology used on, for instance, pay per view selling or other network based payment and authentication methods. In a preferred embodiment, a central computer will monitor the registration and then facilitate both the display of voting screens to the fans, the collection of votes cast from the fan, the tallying of the vote and the relay of the decision to the team members via appropriate outlets at the broadcast venue.

These and other features of the invention will be more fully by reference to the following drawings.

BEST MODE FOR CARRYING OUT THE INVENTION

Figure 1:
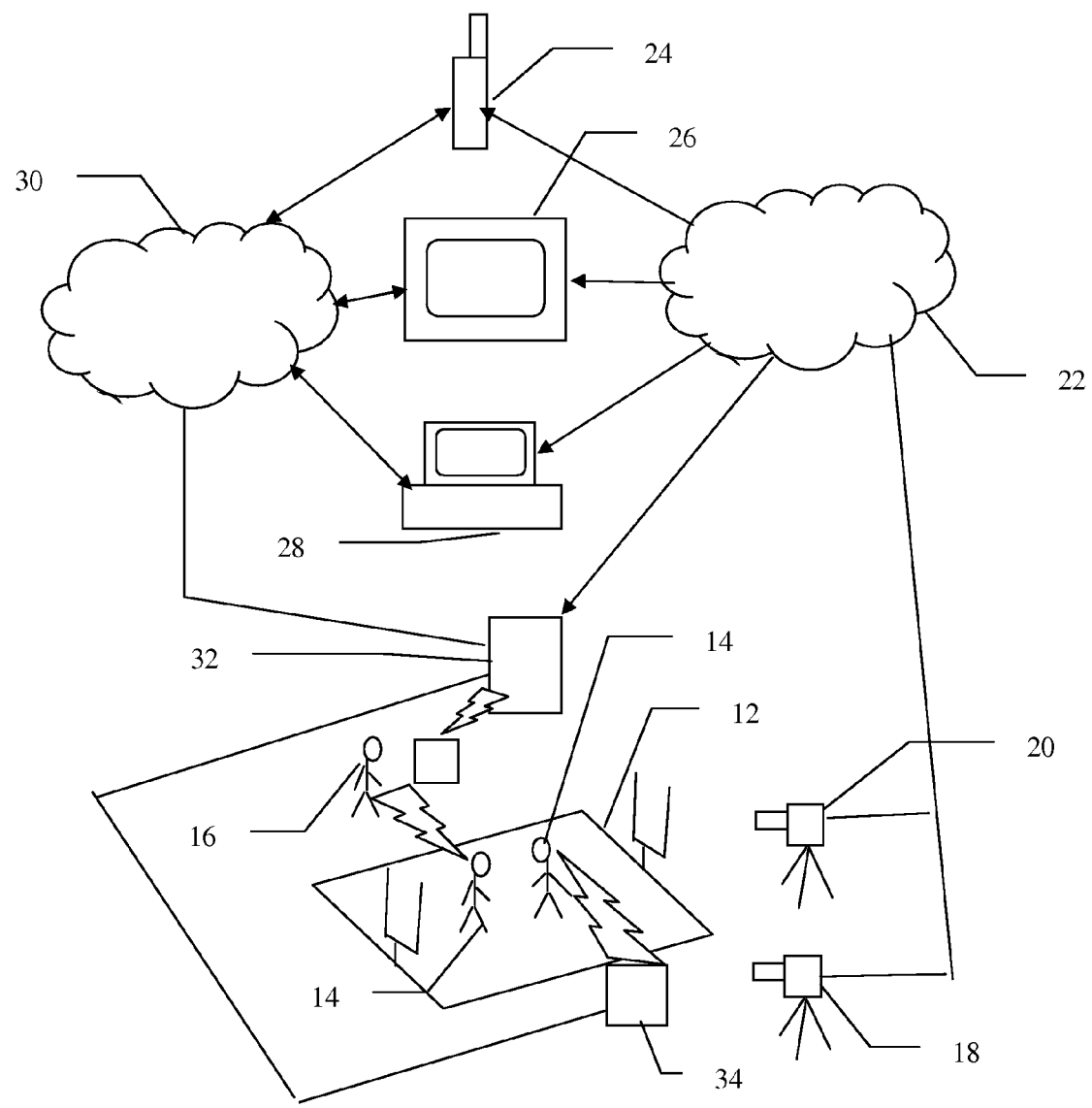
FIG. 1 is a schematic drawing showing a broadcast event being staged in accordance with a preferred embodiment of the present invention.

The present invention provides a system and method for enabling remote participation by spectators in a broadcast sporting event. An objective of the invention is to enable greater interaction between the event competitors and the event viewers, including the ability of the event viewers to influence the course of, and the actual outcome of, the event.

The system an method are applicable to many sporting events such as, but not limited to, golf, football, basketball, baseball, car-racing, soccer, volley ball, hockey, track and field, swimming, cycling, cricket, rugby and tennis, all of which have become extremely popular as spectator events on broadcast television. The system and method are also applicable to those events such as, but not limited to, yachting and triathlon are also, or instead, being broadcast over alternative interactive media such as the internet in the form of updated statistics, as well as over older media such as radio.

The system and method of staging an event to facilitate actual participation by event viewers includes the viewers participating in making strategic or tactical decisions that materially affect the course of the event, and therefore its outcome.

The strategic or tactical decisions are made before, or during, the event and may include, but are not limited to, a choice of player, a choice of a starting line up, whether to take possession or to select field possession, a choice of when to substitute a player and which player to substitute, when to use a designated hitter, a choice of which play to make, a choice of which club to use, when to call a time out. The decisions may rely on the existing rules of the game, or additional rules may be added, for instance a 2× member of a team whose scoring counts double, as described in detailed in related U.S. provisional patent application 60/660,212, the contents of which are incorporated by reference in this application.

In a preferred embodiment, the decisions may be made by pre-registered spectators who are supporters of one of the teams participating in the sporting event. These spectators vote by making a menu selection from a menu of possible choices relating to the sporting event. The menu of choices may, for instance, relate to a player's participation in the sporting event. In a preferred embodiment, the majority decision, i.e., the menu selection received from the majority of the team supporting spectators, is elected as the course of action to be taken by the team or player. The elected course of action may then be relayed to the player or players, and only made public after the play has occurred. In further embodiments, the decision may be make by the "nth caller", i.e. by the single vote that is a designated number in a queue of voters, such as, but not limited to, the $100^{th}$ caller or voter. In a further embodiment, the decision maker may be a single pre-selected fan chosen by lottery or by previously being the nth number voter. In a further embodiment, through out the game, various decisions may be influenced by a mixture of such voting and selection methods.

The participating spectators may be remote to the event, watching it on, for instance television, and participating by means of their TV remote control and an interactive TV menu. Or they may be spectators at the event, participating by, for instance, using their cellular phones, or WiFi-enabled portable devices, to receive and respond to the menus of possible choices. The participating spectator may also participate prior to the event on either live or pre-recorded broadcast preview shows including, but not limited to, video on demand shows.

The system and method of this invention may be characterized in a number of ways, including calling the method "Call the play", "virtual quarterback", "virtual captain", "virtual manager", "fan manager", "pro coach", "strat-e-ball", "strat-e-sport" or "strat-e-vent".

The system and method of this invention allows the viewing public who select to become registered fans, or virtual team members, to play a significant role in the actual competition, providing a true merger of virtual and reality events, as will now be described in detail by reference to the accompanying drawing in which, as far as possible, like numbers represent like elements.

FIG. 1 is a schematic drawing showing a broadcast event being staged in accordance with a preferred embodiment of the present invention. The event to be broadcast is typically staged on a playing field 12 by teams comprised of one or more players 14. The teams may also include non-playing members 16 such as, but not limited to, coaches, managers and other support personal 16. The event is captured by appropriate technology. For instance, a television broadcast is captured by one or more television cameras 20 and associated microphones. A radio broadcast may be captured by microphones alone, and an internet broadcast may be captured by, for instance, global positioning satellite (GPS) devices attached to players or equipment providing 2 or 3 D positional data as a function of time. The data representing the event, i.e., the television pictures and the associated audio in the case of a televised event, is then broadcast by distribution over a network 22 to end-user equipment. The data representing the event may be coded in any of the well known analogue and digital formats for encoding television, radio and data signals. The network 22 may be, but is not limited to, a cable television network, a terrestrial television broadcast network, a satellite broadcast network, a radio network, a cellular telephone network or a data network such as the Internet. The end-user equipment may include, but is not limited to, television sets 26, video equipped telephones 24 and fixed or portable personal computers 28. The end user equipment may be linked to the network via wired or wireless electromagnetic connections, or some combination thereof. The broadcast may also include data from a central server 32 that may be incorporated into the broadcast or may be supplied as, for instance, a separate data channel. The central server 32 may be computer hardware running suitable software modules under the control of one or more operators. The software modules may allow the central server to interact with the end-user modules via the broadcast network 22 or the interaction may be via a separate data network 30. The data network may, for instance, be, but is not limited to, a wide area network (WAN), a cable television network, the Internet or a wireless data network.

The modules running on the central server 32 are capable of interacting with end-users via the end-user equipment for the purposes of registering the end-user a registered fan of one of the participating teams or players on the participating team. This registration may be performed using the technology used in the well known pay-per-view form of television distribution as described in, for instance, U.S. Pat. No. 5,367,330 issued to Haave et al. on Nov. 22, 1994 entitled "Pay-per-view television delivery system", the contents of which are hereby incorporated by reference.

The modules running on the central server 32 are further capable of creating and distributing a menu of options related to the event being, or about to be, broadcast. The menu of options may be presented using, for instance, the technology used to present interactive program guides to television viewers as described in, for instance, U.S. Pat. No. 6,772,433 issue to LaJoie et al. on Aug. 3, 2004, entitled "Interactive program guide for designating information on an interactive program guide display", the contents of which are hereby incorporated by reference.

The software modules running on the central server 32 are further capable of using the interactive program guide technology to collect the registered viewers' selection of options and process them to provide a decision. This processing may, for instance, take the form of tallying the selection chosen by the majority of the registered fans voting, or it may take the form of the first option to receive more than a given percentage or total number of votes. Registered users may be limited to a single vote or selection or may be able to buy additional votes for any given selection. In a further embodiment, registered users who selected the chosen selection in a previous decision may be given one or more additional votes. In a further embodiment of the invention a registered users vote may be weighted by using their prior record in voting the chosen decision, or by some scoring of their prior voting record, either in the current event or their voting in a combination of events in a season of events. In a further embodiment the votes may be weighted by time of voting. For instance, the votes cast closest to a set delay after the screen becomes available may be given the greatest weighting using, were the voting weighting is of the form:

$$W = Ae^{-(T-t)}$$

where W is the weight, A is a constant, T is the preferred time delay after the selection screen become available and t is the actual time of voting after the selection screen becomes available. For instance, T may be set to 30 seconds, so that registered fans who make their selection as close to 30 seconds as possible get have the most effect on the final result. This attempts to give people time to make a reasoned choice, but not to delay too long in voting. The shape of the weighting curve may vary with time of voting according to any well known weighting curve including, but not limited to, an exponential multiplier of the form:

$$f(t) = \exp(-Rt), \text{ where R is a constant,}$$

a Gaussian multiplier:

$$f(t) = \exp(-Rt^2),$$

a Lorentz-to-Gauss resolution enhancement:

$$f(t) = \exp(+R_e t) \cdot \exp(-R_g t^2)$$

or a sinebell squared weighting function:

$$f(t) = \sin^2(\theta + (180-\theta)t/T), \text{ where T=acquisition time,}$$
$$\text{and } \theta = 0°.$$

These functions can, with suitably chosen constants, be used to give more emphasis to fans who vote or make there selections at an earlier or later time during the window of opportunity in which they are allowed to make their selection. The optimal voting time may be linked to the appearance of a logo or other sign, which may be varied randomly within a time period. The logo or sign may be linked to a brand for advertising purposes. For instance, the selection menu may be presented to the registered voters and then a short time later, the logo of a team sponsor may appear for a short time. In one embodiment only those pre-registered fans who register there selection while the logo is being displayed will have there votes or selections count in the decision making process. The team sponsor may pay to have their logo appear. In a further embodiment, the votes may be weighted by, for instance making use of one of the weighting functions detailed above, so that the votes of the fans who make their selection prior to the appearance of the logo are discarded or heavily discounted, while the votes cast coincident with the appearance of the logo count most highly, and then are more and more heavily discounted the further delay between appearance and selection up to a deadline, when the decision is made.

In a further embodiment of the invention, the weighting of the vote may include a component related to when the fan registered to vote. For instance, a fan who registered to vote at least one week before the event may have a vote that counts 50% more than a person who registered later, but before the game started. A fan who registers after the game started may only get to count for 80% of the person who registered before the game started. The weighting may be for all the decisions, or may only apply to selected decisions.

When a decision has been made, that decision may then be relayed to one or more of the participating players. In one embodiment of the invention, the decision may be sent from the central server to a display device 34 on the sidelines of the event. Display device 34 may be, but is not limited to, a wireless computing device, a wireless telephone or a Personal Digital Assistant (PDA) with appropriate wireless communication capability. The non-playing team member 16 may view or hear the decision using display device 34 and convey the decision to one or more players 14 by voice, hand signal or a radio device. For instance, one or more players 14 may be equipped with a suitable radio receiving device as described in, for instance, U.S. Pat. No. 6,009,563 issued to Swanson et al. on Jan. 4, 2000, entitled "Sports safety helmet", or U.S. Pat. No. 3,983,483 issued to Pando on Sep. 28, 1976 entitled "Communications device arranged to be worn in intimate contact with the body of a user", the contents of both of which are here by incorporated by reference.

In a preferred embodiment of the invention display device 34 may be a computer equipped with suitable communications capability so the decision is relayed directly to one or more players 14 participating in the event using, for instance, the technology described in the above cited US patents.

Figure 2:
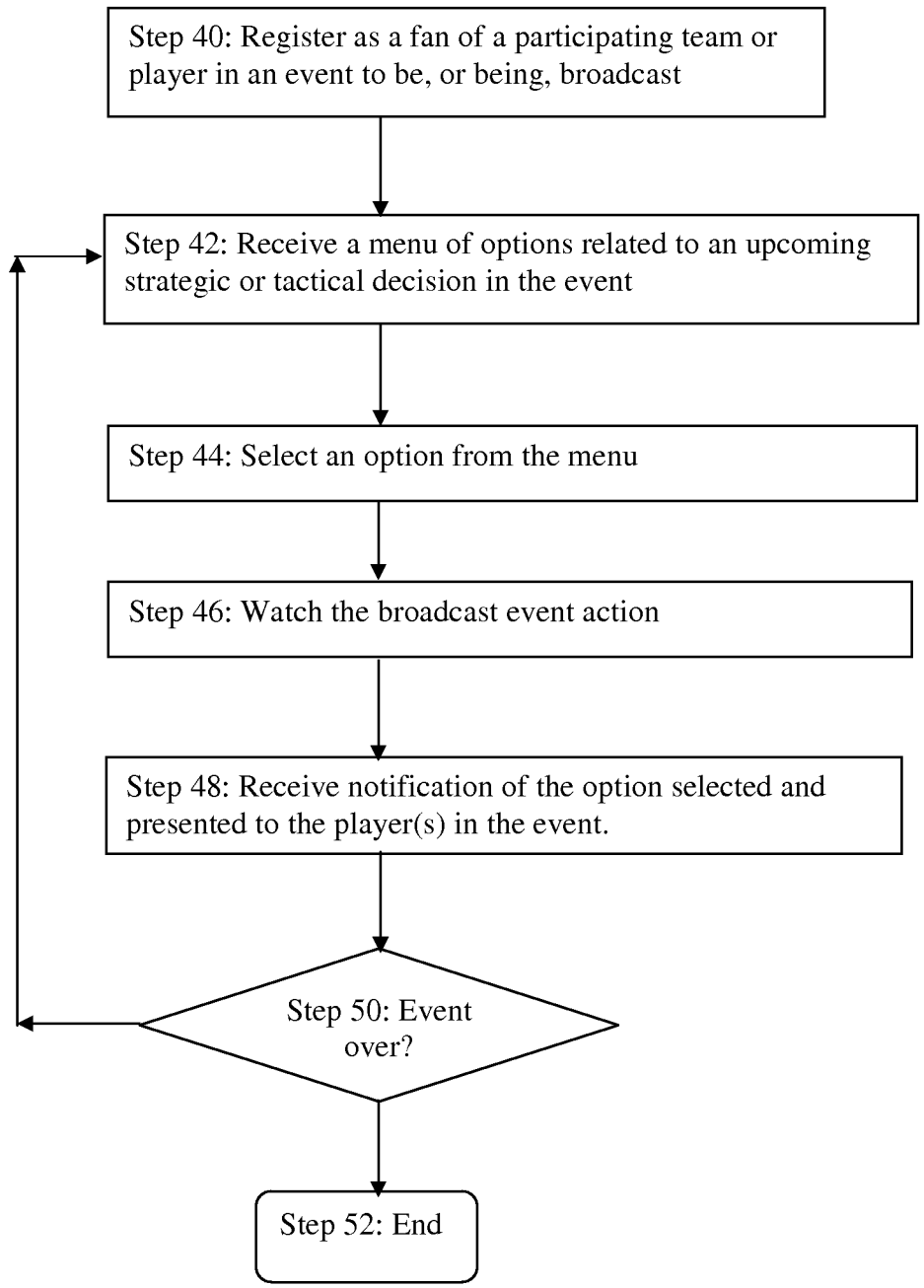
FIG. 2 is a flow chart showing the steps by which viewers of a broadcast event may influence the course and outcome of the event in accordance with a preferred embodiment of the present invention.

FIG. 2 is a flow chart showing the steps by which viewers of a broadcast event may influence the course and outcome of the event in accordance with a preferred embodiment of the present invention.

In step 40, a spectator of an event that is about to be, or is already being broadcast may register to participate as a fan, or decision influencing member, of one of the teams or players participating in the event. The spectator may be remote to the event, viewing the broadcast, or may at the event participating via a cellular phone or Wifi mobile device. The registration may include different levels of participation for different payment amounts, ranging from, for instance, full membership that allows participation in all decisions to selecting to only participate in certain decisions or decisions affecting certain players. For instance a viewer may select to participate in the selection of the starting line up only, or in decisions to substitute players during the game. The viewer may instead opt not to participate in team selection decisions but only in play calling decisions, such as, but not limited to, whether to punt or go for forth down.

Prior to or during the event, a spectator who is pre-registered fan will, in step 42, receive a menu of options related to an upcoming decision to be made about a play or a portion of the event.

In step 44, the pre-registered fan will make a selection from the menu. This selection may include using a television remote in a fashion similar to the way a channel selection is made from an electronic programming guide, and may use similar technology as detailed in the US patents cited previously. Or for a spectator who is a the event, the selection may be made by selecting options on a cellular phone including, but not limited to, calling a particular number or sending a particular text message. The selection may, for instance, involve selecting a particular play from a menus such as, in a football game, whether, in the next play of the game, the quarterback should to throw to one or more particular running backs, or whether the quarter back should use one or more particular line backers to carry the ball. In alternative embodiments of the event, the spectators who are pre-registered fans may get feed back during the voting period in the form of a live tally of the votes so far, so as to encourage participation.

In step 46, the spectator may watch the play, or portion of the event, affected by their decision occur. In a preferred embodiment, even the spectators who are pre-registered fans and who cast their vote may watch the portion of the event affected by their participation unfold without knowing what the consensus decision was that was relayed to the players on the field.

In step 48, after play or portion of the event affected by the decision has occurred, the pre-registered fan may be told what the decision was. The decision may only be displayed to registered fans of the team, or it may be made publicly available. In addition to the decision, the results of the voting on all the selection options may be displayed. These results may show both the weighted and un-weighted voting on the selections if the selection votes are being weighted.

In step 50, if the event is not over and there are more tactical or strategic decision points in the game that are to be voted on, the next menu of options will be presented in step 42. If the game is over, or there are no more strategic or tactical decisions to be participated in by the pre-registered fans or the selected category of fan participation, the service ends in step 52.

In a further embodiment of the invention, steps 46 and 48 may be reversed, i.e., the registered fans may be told the decision that was relayed to the players on the field before, or as, the affected portion of the event unfolds.

Figure 3:
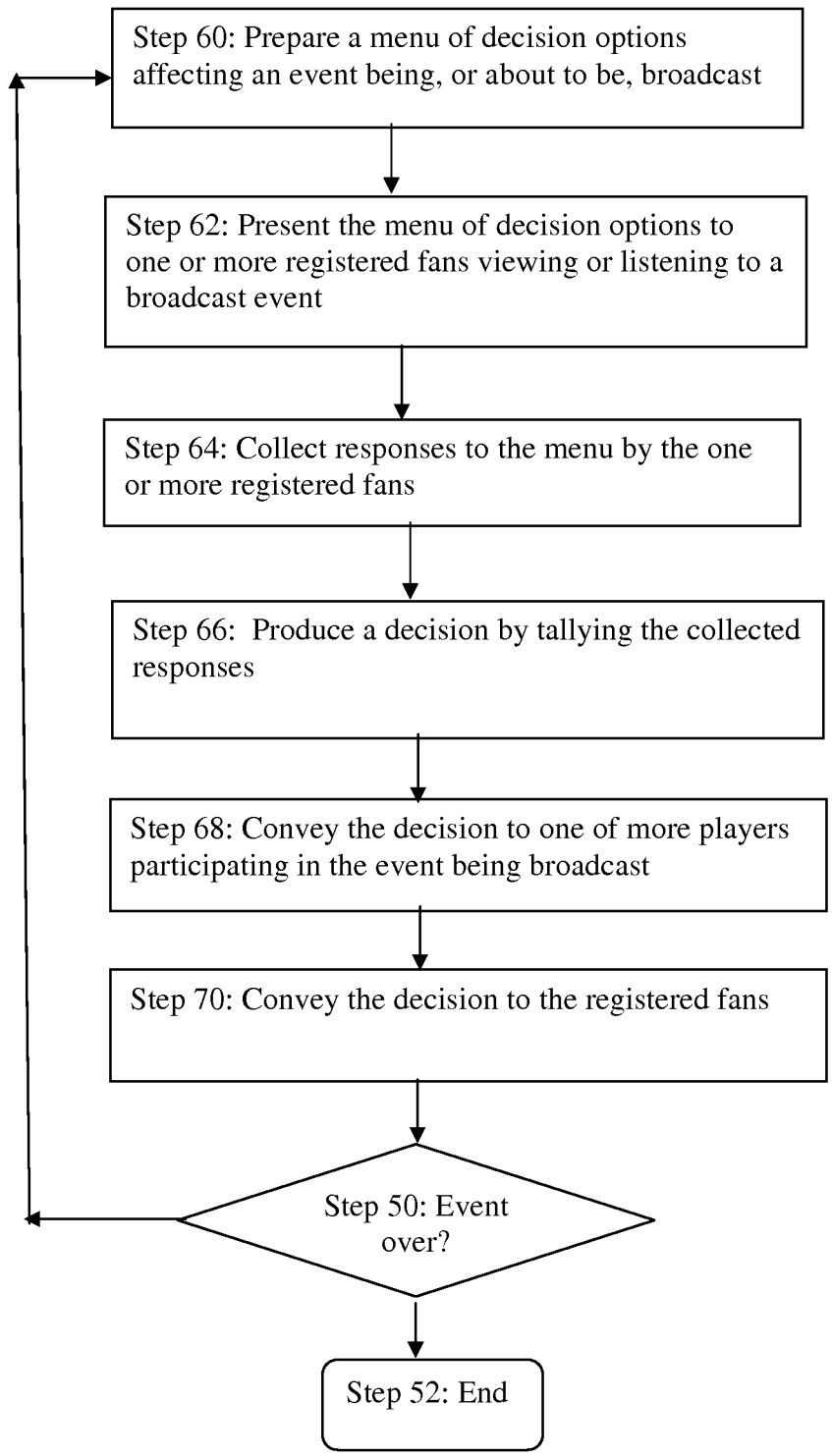
FIG. 3 is a flow chart showing the steps in gathering, tallying and relaying the decision from the registered fans to one or more members of the participating teams in accordance with a preferred embodiment of the present invention.

FIG. 3 is a flow chart showing the steps in gathering, tallying and relaying the decision from the registered fans to one or more members of the participating teams in accordance with a preferred embodiment of the present invention.

In step 60 a menu of decision options affecting an event about to be broadcast is prepared. The decisions may be game or event dependent and may include, but are not limited to, decisions on team selection, choice of players, a choice of a starting line up, a choice of whether to call head or tails in a coin toss, in the event of winning a coin toss, whether to take possession or to select field possession, or whether to bat or field in a cricket match, a choice of when to substitute a player and which player to substitute, when to use a designated hitter, a choice of which play to make, a choice of which club to use, when to call a time out. The rules of certain games, such as football, rugby, cricket and rugby lend themselves more readily to remote fan participation because of the naturally occurring breaks and set type of decision. In cricket, for instance, decisions such as, but not limited to, team selection, to bat or to field, the batting order, which bowlers to use and when to change them, the placing of fielders and decisions such as when to declare an innings, all lend themselves to participation by remote crowd voting. Similarly in football, in addition to team selection and possession verses field direction, each play provides an opportunity for the fans to participate. There are also key decision points, like whether to go for a forth down, or to punt, under various circumstances. In rugby there are many decisions on whether to kick or run the ball, both during the course of play and when penalties are awarded.

The decisions may rely on the existing rules of the game, or additional rules may be added, for instance a 2× member of a team whose scoring counts double may be part of a golf game, as described in detailed in related U.S. provisional patent application 60/660,212, the contents of which are incorporated by reference in this application.

In step 62 the menu of decision options is presented to the one or more registered fans viewing or listening to the broadcast event.

In step 64 the responses to the menu by the one or more registered fans are collected.

In step 66 a decision is produced by tallying the collected responses.

In step 68 the decision is conveyed to one or more players participating in the event being broadcast.

In step 70 the decision is conveyed to the registered fans.

In step 50, if the event is not over and there are more tactical or strategic decision points in the game that are to be voted on, the next menu of options will be presented in step 42. If the game is over, or there are no more strategic or tactical decisions to be participated in by the pre-registered fans or the selected category of fan participation, the service ends in step 52.

In a further embodiment of the invention, fans in the stadium may participate in the decision making using devices such as, but not limited to, cell phones or WiFi enabled devices. For instance the fans may pre-register to participate, or may automatically be registered by calling a particular number. The selections and the numbers to call may be displayed on, for instance, the large screen TVs that are common in most stadiums.

In a further embodiment of the invention, fans for the home team may participate in the decisions by being in the stadium while fans from the away team may participate from afar.

In a further embodiment of the invention, caller ID technology may be used to ensure that once a fan votes for a particular team, they may only participate in the decisions of that team for the duration of that particular event.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

Industrial Applicability

In the fields of broadcast television and advertising there is significant interest in providing events that appeal to a large number of people. Such a spectator participation enhanced, broadcast sports event would be of considerable utility to television broadcasters and advertisers in attracting audiences of younger spectators and viewers who are more accustomed to participating in interactive entertainment. Such spectator participation enhanced events enabled by cell phone participation would also be useful in the cellular phone industry, particularly the emerging market for video over the cell phone.

What is claimed is:

1. A method for enabling a spectator to influence the outcome of a broadcast sporting event, said method comprising:
   programming a digital processing device to perform the functions of:
   broadcasting, over a digital network, a live sporting event comprising a first player representing a first team and a second player representing a second team to at least one first team supporting spectator, wherein said at least one first team supporting spectator is pre-registered;
   determining, with the aid of input from a user, a menu of two or more possible choices relating to said first player's participation in said live sporting event;
   automatically sending said menu via said digital network to said at least one first team supporting spectator;
   automatically receiving one or more menu selections from said at least one first team supporting spectator and automatically ordering said received menu selections by a time they are received;
   automatically weighting the value of a menu selection by a time of receipt of said menu selection, wherein said step of weighting uses a function of the form W=Ae-|T-t| where W represents the weighting function, A is a predetermined constant, e is the base of the natural logarithms, T is a preferred time for receipt of the menu selection and t is an actual time of receipt of the menu selection;

automatically determining a majority menu selection of said weighted received menu selections as an elected course of action; and implementing said elected course of action as part of said live sporting event, wherein said implementing step takes place during the actual play of the game and modifies the play of said first player or said first team in order to influence the outcome of said sporting event.

2. The method of claim 1 further including the step of broadcasting an indicia and where said step of electing further comprises only using menu selections made while said indicia is being broadcast.

3. The method of claim 2 wherein said step of sending further comprises use of one of a cellular phone, a WiFi connected device, a cable television, a satellite connected television, a radio, an email, a text message, a phone call, an instant message or a TV menu.

4. The method of claim 3 wherein said menu of two or more possible choices comprises a selection of a starting line-up of said first team, a substitute for said first player, a designated hitter, a play, a time out, a club to use, an option to kick or an option to select a side.

5. The method claim 4 wherein said broadcast sporting event is a cricket match and said menu of two or more possible choices comprises a selection of whether to bat or field, whether to use said first player as a bowler, where to place said first player on the field and whether to use said first player as a batsman.

6. The method of claim 5 wherein said step of implementing further comprises the step of delivering said decision to said first team player.

7. The method of claim 6 wherein said step of delivering further comprises the use of a wireless device.

* * * * *